(12) United States Patent
Yoshizawa et al.

(10) Patent No.: US 6,980,387 B2
(45) Date of Patent: Dec. 27, 2005

(54) MAGNETIC DISK MEDIUM, FIXED MAGNETIC DISK DRIVE UNIT, AND METHOD THEREOF

(75) Inventors: Tsuyoshi Yoshizawa, Nagano (JP); Kiminori Sato, Nagano (JP)

(73) Assignee: Fuji Electric Co., Ltd., (JP)

( * ) Notice: Subject to any disclaimer, the term of this patent is extended or adjusted under 35 U.S.C. 154(b) by 115 days.

(21) Appl. No.: 10/620,313

(22) Filed: Jul. 15, 2003

(65) Prior Publication Data

US 2004/0057149 A1 Mar. 25, 2004

(30) Foreign Application Priority Data

Jul. 15, 2002 (JP) .............................. 2002-205886

(51) Int. Cl.[7] .......................................... G11B 15/087
(52) U.S. Cl. ....................................... 360/69; 360/135
(58) Field of Search .................. 360/69, 71, 72.1–72.2, 360/75, 135; 711/164; 713/189, 193, 194

(56) References Cited

U.S. PATENT DOCUMENTS

| | | | | |
|---|---|---|---|---|
| 5,363,255 A | * | 11/1994 | Ivers et al. .................... | 360/69 |
| 5,805,551 A | * | 9/1998 | Oshima et al. ................ | 705/57 |
| 6,118,632 A | * | 9/2000 | Albrecht et al. ............. | 360/135 |
| 6,222,697 B1 | * | 4/2001 | Ottesen et al. ................ | 360/75 |
| 6,285,763 B1 | * | 9/2001 | Gotoh et al. ................ | 380/203 |
| 6,324,026 B1 | * | 11/2001 | Thomas, III ................. | 360/69 |
| 2002/0112161 A1 | * | 8/2002 | Thomas et al. ............. | 713/189 |
| 2004/0100711 A1 | | 5/2004 | Sato et al. | |

FOREIGN PATENT DOCUMENTS

| | | |
|---|---|---|
| JP | 06-068444 | 3/1994 |
| JP | 7-153047 A | 6/1995 |
| JP | 2000-306236 A | 11/2000 |

* cited by examiner

*Primary Examiner*—David Hudspeth
*Assistant Examiner*—James L Habermehl
(74) *Attorney, Agent, or Firm*—Rossi, Kimms & McDowell, LLP

(57) ABSTRACT

A magnetic disk medium allows embedding ID information that prevents manipulation and yet holds its uniqueness. ID information for uniquely identifying a medium is recorded separately as a master ID information on a preformatted region and as individual medium ID information on a non-preformatted region in a pre-embossed type magnetic disk.

7 Claims, 9 Drawing Sheets

MAGNETIC DISK MEDIUM, FIXED MAGNETIC DISK DRIVE UNIT, AND METHOD THEREOF

BACKGROUND

A fixed magnetic disk drive unit reads and writes signals while its magnetic head floats low (with a gap in the submicron order) over its magnetic disk rotating at a high speed. A conventional magnetic disk used in a fixed magnetic disk drive unit has been manufactured by laminating a magnetic layer and a protective layer on a flat substrate of nonmagnetic material, for example, aluminum or glass. In recent years, some of the fixed magnetic disk drive units have been using a pre-embossed type magnetic disk that records preformatted information, such as servo information in the uneven patterns formed on the substrate. Nikkei Electronics No. 586 (7 Jul. 1993) for example discloses a fixed magnetic disk drive unit using a pre-embossed medium that carries servo patterns and recording tracks formed with uneven patterns on a glass substrate. In the servo pattern of the medium, pits of an uneven or non-uniform pattern are magnetized in the opposite direction along the track line. The magnetic head reads a signal pattern of 1/0 by detecting or sensing leakage magnetic flux at the boundary of the main surface and the pit.

Servo information and recording tracks of the pre-embossed magnetic disk can be formed with high precision because the information and the tracks are manufactured by a method similar to the method in the optical disk production. The pre-embossed systems are expected to be applied to a ROM disk storing programs or data, as well as the application to the servo pattern. Presently, image data, sound data, and various software data (hereinafter, referred to as "contents") are distributed through networks, such as the internet. Fixed magnetic disk drive units or memory cards are used for temporarily storing the data of these contents that are bought and downloaded.

With increase in the distributing quantity of the digital contents, digital copyright management systems have been introduced for protecting the contents. A digital copyright management system performs a certain operation on the purchased contents to prevent transferring of a copy of the contents to a third party, and uploading and delivering to the internet.

Some digital copyright management systems provide a scheme that generates a key based on hardware information of the client's PC that playbacks the contents, and that does not permit playback without the key. An example of such a system working jointly with a smart card (a memory card capable of intelligent functions) uses hardware ID information that is embedded in the smart card and unique to the card. This ID information is embedded in an unmanipulatable condition, which enhances security.

Present fixed magnetic disk drive units do not use such ID information embedded in the medium. One of the reasons is because the structure of the fixed magnetic disk drive unit is designed to allow rather easy rewriting of data. Embedding ID information using a magnetic head with software can hardly prevent one from manipulating the ID information. One way to solve that problem is by physically embedding ID information like the above-mentioned pre-embossed type magnetic disk. However, the pre-embossed type magnetic disk formed by a stamper has a problem in that the magnetic disks formed by the same stamper have the same ID information. That is, uniqueness of ID information cannot be obtained in a mass production scale. Accordingly, there is a need to provide a magnetic disk medium that can be embedded with unmanipulatable ID information, while also being able to record unique ID information. The present invention addresses this need.

SUMMARY OF THE INVENTION

The present invention relates to a magnetic disk medium and a fixed magnetic disk drive unit that reads and writes digital information by a magnetic head, and a method thereof. In particular, the present invention relates to a magnetic disk medium and a fixed magnetic disk drive unit that are given a security function by embedding identification information in the magnetic disk medium.

Accordingly, one aspect of the present invention is a magnetic disk medium. The medium is comprised of a substrate having a recording region. The recording region has a preformatted region with uneven surface structure and a non-preformatted region with uniform surface structure. The recording region has ID information for uniquely identifying the magnetic disk medium. Specifically, the ID information includes first ID information prestored in the preformatted region and second ID information stored in the non-preformatted region.

The uneven surface structure of the preformatted region includes pits that are sufficiently deep in relation to the uniform surface structure of the non-preformatted region to prevent inversion of magnetization direction by a magnetic field generated by a gap of a recording head of a fixed magnetic disk drive unit for writing to the magnetic disk medium.

The pair of the first ID information and the second ID information can be recorded on each recording surface of the magnetic disk medium, each pair having a different ID information. Each of the first ID information and the second ID information can be encrypted in terms of a prescribed cryptosystem. Each of the first ID information and the second ID information can include a body of ID information that is identifying information and digital signature information for the body of ID information.

Another aspect of the present invention is a fixed magnetic disk drive unit that incorporates one or more of the magnetic disk medium described above. The drive unit includes a readout means for reading out the first ID information and the second ID information on the magnetic disk medium, a decryption means for decrypting the first ID information and the second ID information, a verification means for verifying the first ID information and the second ID information based on digital signature information, and a transfer means for transferring a pair of the first ID information and the second ID information to a host apparatus.

Another aspect of the present invention is a method of securing data in the magnetic recording medium described above. That is, the method includes providing the recording medium having the recording region, recording the ID information for uniquely identifying the magnetic disk medium in the recording region, wherein the ID information includes first storing the first ID information in the preformatted region and then storing the second ID information in the non-preformatted region.

DETAILED DESCRIPTION

Figure 5:
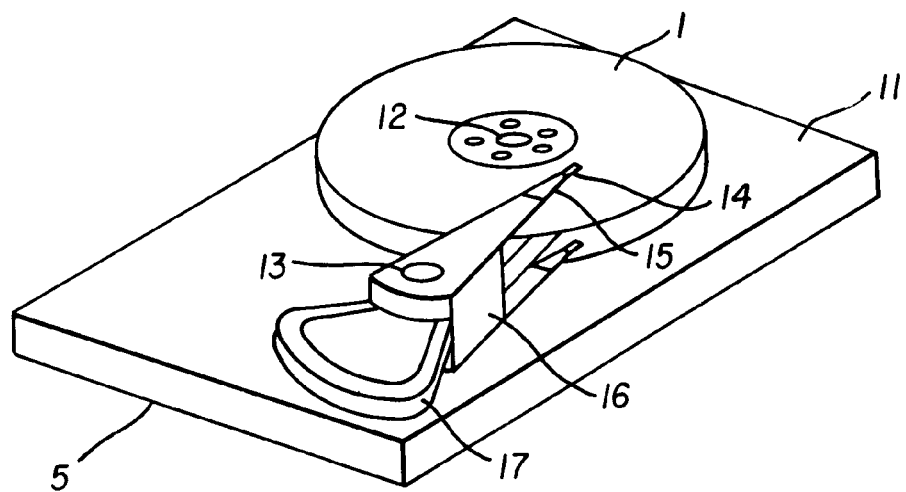
FIG. 5 is an illustration showing a structure of an embodiment of a fixed magnetic disk drive unit according to the present invention.

Some aspects of preferred embodiments of the present invention will be described in detail with reference to the accompanying drawings. FIG. 5 is a schematic illustration of a fixed magnetic disk drive unit of a preferred embodiment of the present invention. The fixed magnetic disk drive unit comprises at least one arm 15 each supporting a magnetic head 14, a comb-shape carriage 16 holding the arm 15, a voice-coil motor 17 for driving the carriage 16, and at least one magnetic disk 1. All of these components are mounted inside a housing 11. In the illustrated embodiment a plurality of stacked magnetic disks 1 is fastened to a spindle 12, which can be rotated at a constant angular velocity by a spindle motor (not illustrated) installed in the housing 11. The carriage 16 is oscillated about a pivot 13 by the voice-coil motor 17. A plurality of magnetic heads 14 are attached to the tips of the corresponding number of arms 15. The magnetic heads are positioned to float over the disk surface with a small gap. The magnetic heads float over the rotating disk following the movement of the carriage 16.

Figure 2:
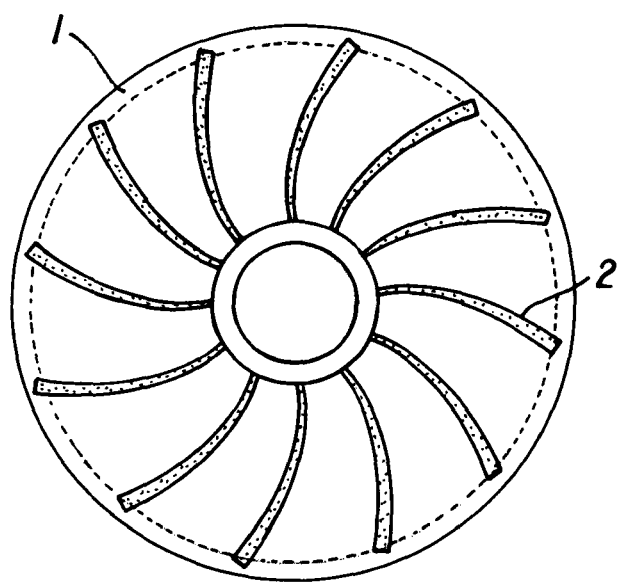
FIG. 2 is a plan view of an embodiment of a magnetic disk according to the present invention.

FIG. 2 is a plan view of one embodiment of a magnetic disk medium according to the present invention. The magnetic disk 1 is a pre-embossed type magnetic disk, where a part of recorded information is formed with uneven/non-uniform surface structure, such as having recesses/pits. A magnetic film and a protective layer 1M are laminated on a substrate made of plastics, for example. A recording plane of the magnetic disk comprises radially extending servo zones 2 for storing control information and concentric tracks 27, 29 (see FIG. 6) for recording data.

Figure 6:
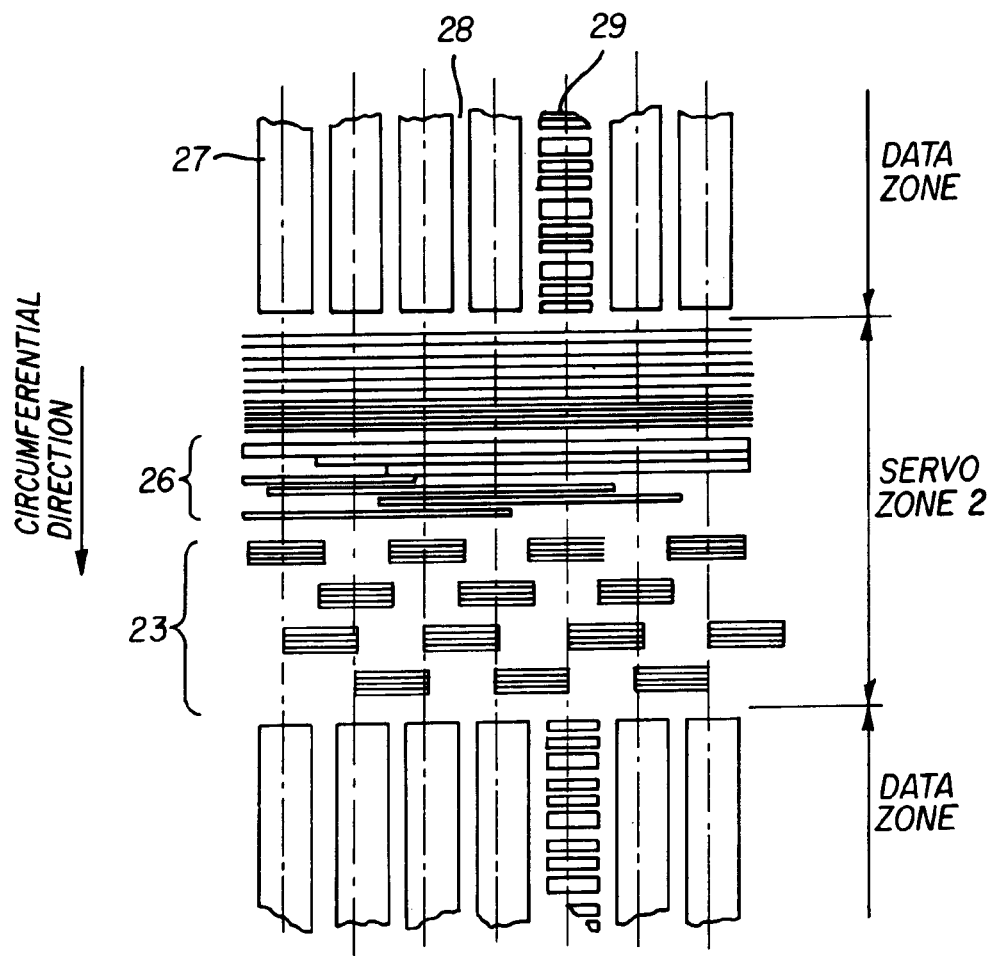
FIG. 6 illustrates details of a recording plane of an embodiment of a magnetic disk according to the present invention.

FIG. 6 is an illustration showing details of the recording plane of the magnetic disk 1. In the servo zone 2, the dotted area is the surface portion that is level with the main surface of the substrate; the unpatterned or blank area is the recessed/pitted portion; and other area is additional uneven portion containing different degree of pits and the surface portion that is level with the main surface of the substrate. The servo zone 2 contains control information formed with uneven/non-uniform pattern. The information can include track ID for specifying a track position, lattice patterns 23 for detecting displacement of the head from the track center, and other control information.

The servo zone 2 interrupts the concentric tracks 27, 29, which are level with the main surface of the substrate. Guard bands 28, which are formed by grooves between the tracks, are formed between the tracks for avoiding interference from adjacent tracks. There are two types of tracks. One type of track is a non-preformatted (capable of reading/writing data) region, i.e., track 27. Another type of track is an uneven region composed of small pits, i.e., track 29, which is preformatted (capable of reading only).

Both preformatted and non-preformatted tracks are logically formatted. That is, the tracks are divided into sectors, which are a basic unit of read/write. Each sector can include a body of the data, header information, and a redundant byte for error correction. The header information can include address information of the sector and synchronization information for generating a clock synchronized with the data. The body of the data is transformed into a code with limited succession of zeros (for example, 2-7RLL code).

Figure 4:
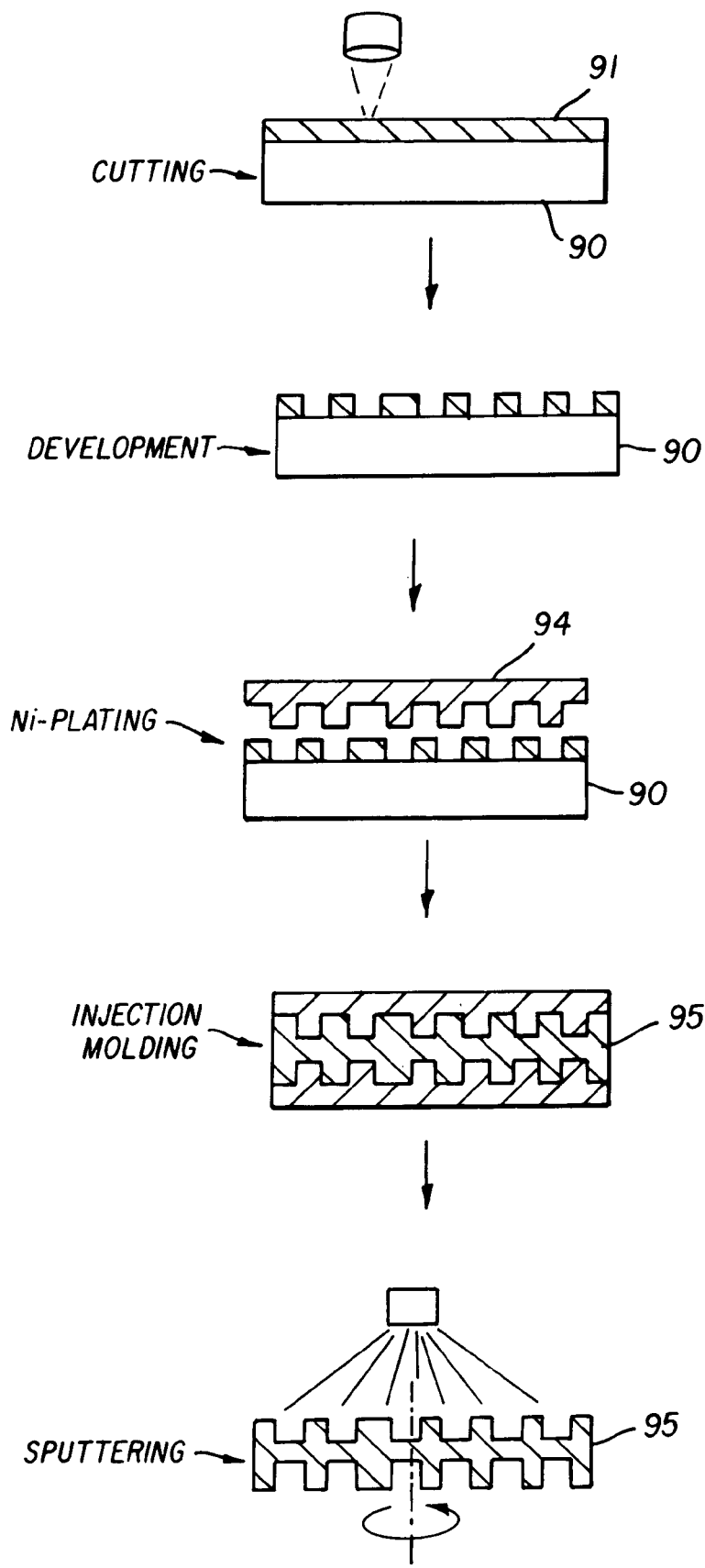
FIG. 4 illustrates a method for manufacturing an embodiment of a magnetic disk according to the present invention.

The magnetic disk 1 can be manufactured by a method for manufacturing an optical disk. FIG. 4 shows the process of the method. A glass disk 90 is polished and finished to a flawless and flat surface condition. A photosensitive agent (resist) 91 is applied on the disk. Then, laser light is irradiated by a laser cutting apparatus intermittently corresponding to the pattern to be recorded. By developing, the laser irradiated portion dissolves and pits are generated on the surface according to the pattern. The surface is then nickel-plated rather thick to obtain a stamper 94, which can then be used as a mold to form a substrate 95 by injection-molding a non-magnetic resin material (substrate) using the stamper 94. After molding the nonmagnetic substrate 95, a magnetic layer and a protective layer are laminated in that order on the surface of the substrate 95 by a sputtering method, for example.

Figure 1A:
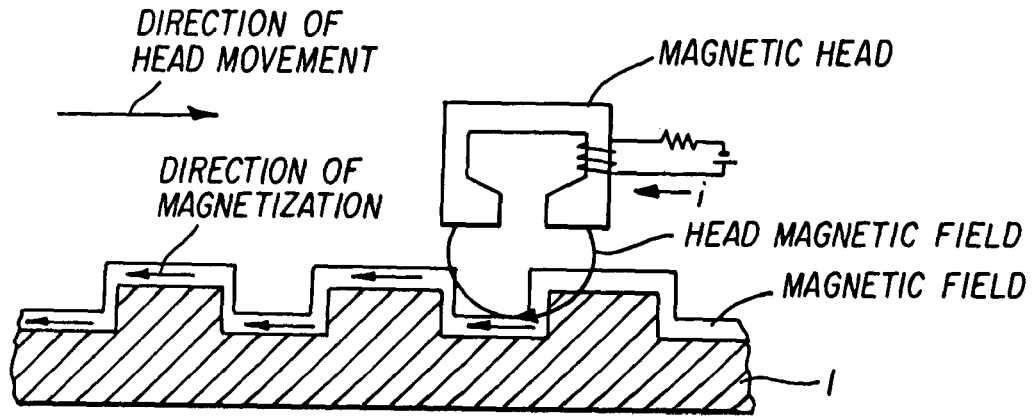
FIG. 1(a) illustrates a principle of primary magnetization of an embodiment of a magnetic disk according to the present invention.
Figure 1B:
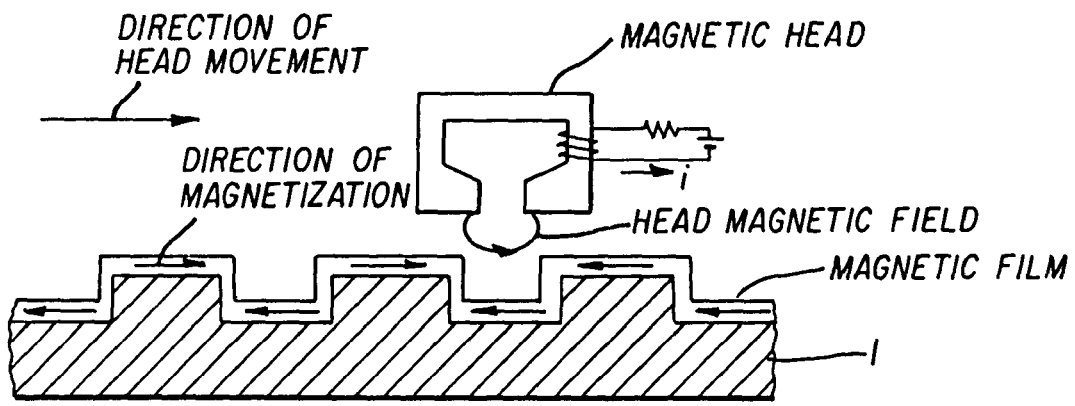
FIG. 1(b) illustrates a principle of secondary magnetization of an embodiment of a magnetic disk according to the present invention.

A signal pattern becomes detectable by a magnetic head after the magnetic disk is magnetized. Magnetization is first conducted in one direction on both the main surface and the pits using a magnetic head that generates a strong magnetic field, as shown in FIG. 1(a) (primary magnetization). Then, secondary magnetization is conducted in the direction opposite to the first magnetization using a magnetic head generating an appropriate magnetic field weaker than in the primary magnetization, as shown in FIG. 1(b). Because the second magnetization does not invert the magnetization direction at the pits, transition of magnetization arises at the boundary between the main surface and the pit. While the magnetic head relatively moves through the uneven/non-uniform portion flying over the disk, a voltage signal arises at the magnetization transition position with a positive or negative peak corresponding to the direction of the transition of the magnetization.

Figure 3:
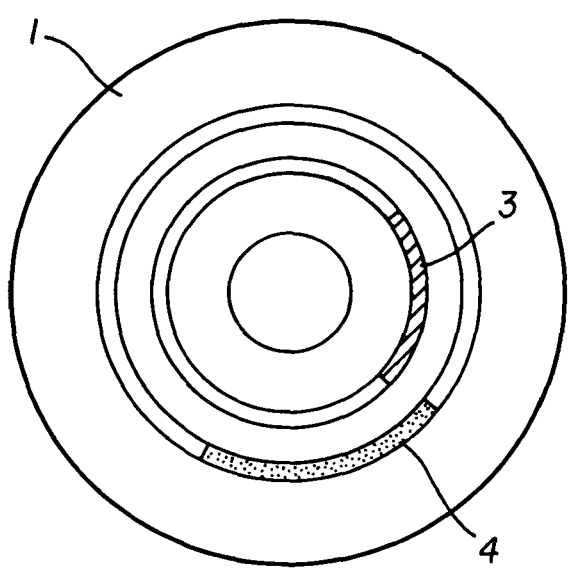
FIG. 3 is another plan view of an embodiment of a magnetic disk according to the present invention.

A signal pattern can be read out by amplifying the voltage signals and detecting peaks. A recording plane of the magnetic disk of the present invention can store two types of ID information, a master ID information 3 and an individual medium ID information 4, on the respective track as shown in FIG. 3. This allows unique identification of a medium. The master ID information 3, already embedded in the stamper, can be transferred to the magnetic disk from the stamper as a pattern of pits in the molding step. Accordingly, magnetic disks molded using the same stamper have the same master ID information. The master ID information 3 contains a master ID to uniquely identify the stamper. The master ID can use a serial number of the stamper, for example. When front and back recording planes of a magnetic disk are formed using two stampers embedded with different master ID information, then different recording planes have different ID information.

The master ID information 3 is embedded as an uneven pattern in the stamper preferably through encryption. The encryption hinders analysis by disassembling the fixed magnetic disk drive unit. Here, a cryptosystem is not limited to a special one. The master ID information 3 desirably includes digital signature information for the master ID. The digital signature can examine whether the master ID is created by a regular manufacture or not, and whether the master ID has been manipulated.

The digital signature can be produced by transforming the master ID to a fixed length data (hash code) by a hash function, and then encrypting the hash code using a secret key in a public key cryptosystem. To examine this digital signature, first the master ID and the digital signature are read out of the magnetic disk, and the digital signature is decrypted using a public key that pairs with the above-mentioned secret key to obtain a hash code. Comparing this hash code with a hash code obtained from the master ID by a hash function, judgment is made on coincidence of the two. If the coincidence is confirmed, the master ID may be presumed to be created by a regular manufacturer, and not manipulated.

The master ID information can be embedded in the preformatted track (read only track 29) in FIG. 6. This read only track 29 can be located at any track position in the magnetic disk 1. The pits on the read only track 29 can be made sufficiently deep so that the recording field generated at the gap by the recording head of the fixed magnetic disk drive unit cannot alter the prerecording formed at the bottom of the pits. The optimum depth of the pits varies depending on characteristics of the head and the floating gap. Consequently, the optimum depth of the pits is selected according to the hardware specification of the fixed magnetic disk drive unit.

Figure 7:
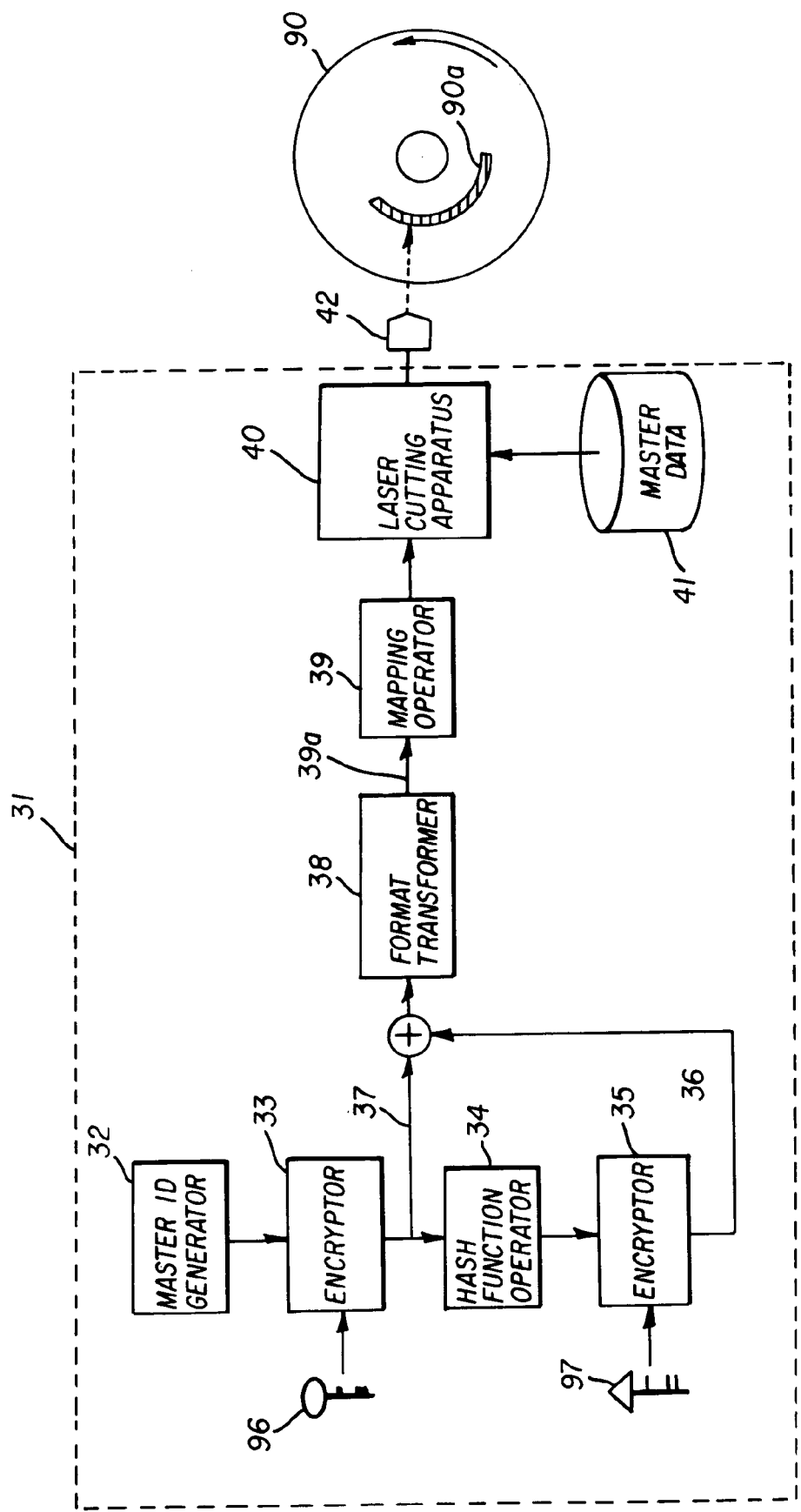
FIG. 7 is a diagram showing a structure of a working apparatus for producing a stamper usable for manufacturing a magnetic disk according to the present invention.

FIG. 7 is a diagram showing the structure of a working apparatus 31 used in a process for manufacturing a stamper embedding a master ID. This apparatus is used for writing a pattern corresponding to the pits on the surface of a glass substrate coated with resist. Operation of this working apparatus will be described below.

A master ID generator 32 generates a unique ID number, say 10572972. An encryptor 33 encrypts the ID number using a common key 96 that is input from outside. A hash function operator 34 transforms the encrypted master ID into a fixed length hash code with 128 bytes, for example, by a prescribed hash function operation. An encryptor 35 encrypts this hash code using a secret key 97 input from outside, to generate a digital signature 36. The encrypted master ID 37 and the digital signature 36 are combined and input to a format transformer 38. The format transformer 38 transforms the input data with a byte format to a serial bit string, and executes format transformation according to a logical format of the track, and further conducts transformation to a prescribed code. The mapping operator 39 executes mapping of the output data from the format transformer 38 in a two-dimensional region according to the track position to which the master ID information is recorded. Consequently, information for a pattern of pits is generated corresponding to the master ID information.

A laser cutting apparatus 40 receives a master data 41 storing information of uneven patterns for servo zones and recording tracks, and uneven pattern information 39a generated by a mapping operator 39. While rotating a glass substrate 90 having a surface coated with photosensitive material, the laser 42 is shot on and off based on this information. After developing the glass substrate 90, the resulting uneven surface with pits is nickel-plated, to complete a stamper.

By making the master ID information unchangeable with the magnetic head used in the fixed magnetic disk drive unit, the magnetic disk can be made tamper proof. As to the issue that uniqueness cannot be held because the magnetic disks manufactured using the same stamper have the same ID information, the magnetic disk of the present invention further uses individual medium ID information as second ID information. The individual medium ID information can contain ID number that is unique only to that magnetic disk. Different individual medium ID information can be recorded on the front and back recording planes of the magnetic disk. Since a sheet of magnetic disk can use a plurality of ID information, security management can be made more flexible. Like the master ID information, this individual medium ID information can also be encrypted at the time of writing to the magnetic disk. A cryptosystem in this case is also not limited to any special one. The individual medium ID information, like the master ID information, favorably containing digital signature information.

The individual medium ID information is recorded by a magnetic head on one of the tracks except the read only track 29, that is, on a non-preformatted track. The track position is not limited to any specific position. The step for recording this individual medium ID information in the manufacturing process is conducted after completion of assembling the fixed magnetic disk drive unit.

Figure 9:
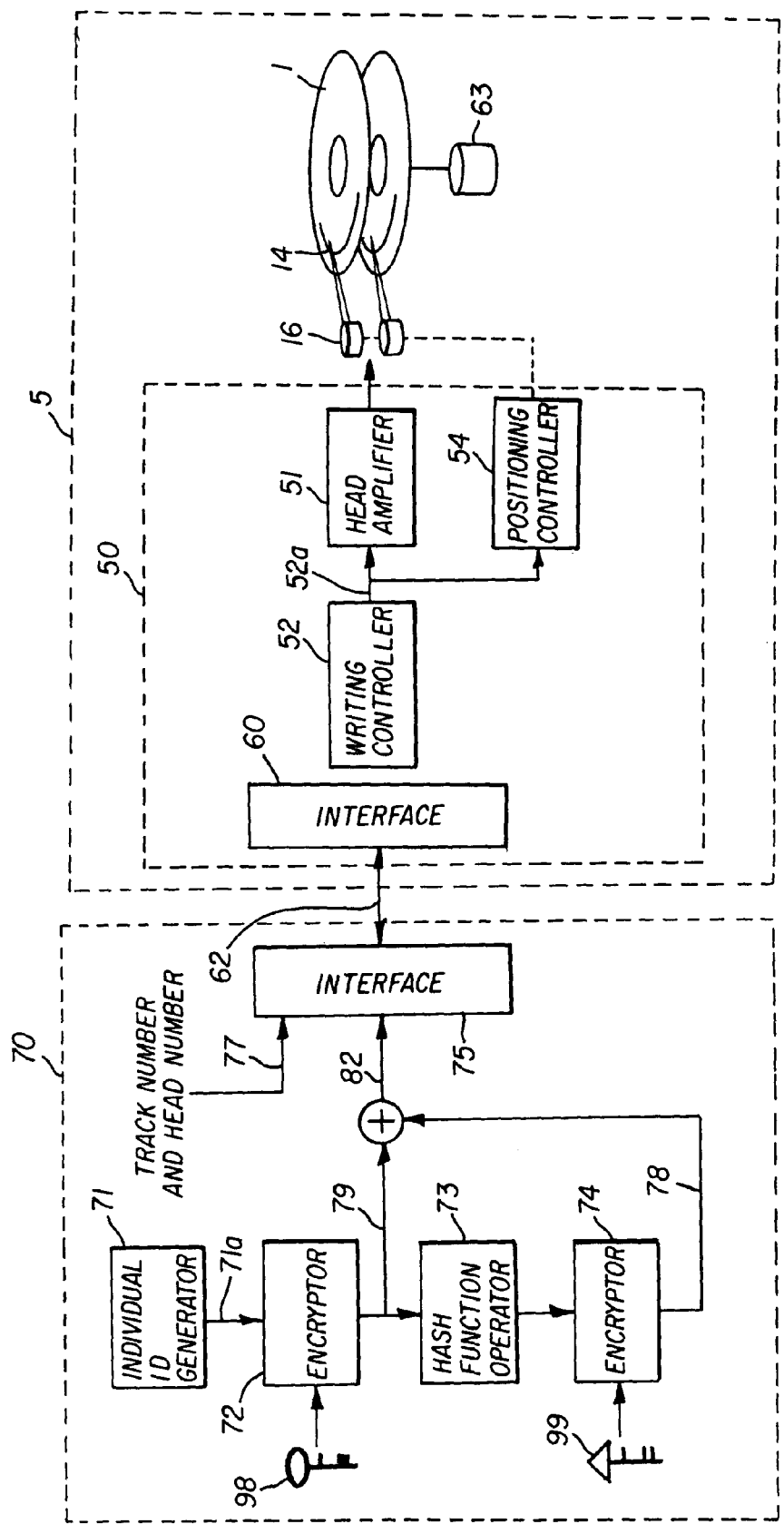
FIG. 9 shows a construction of an apparatus for writing individual medium ID information in a magnetic disk according to the present invention.

FIG. 9 schematically illustrates an apparatus for writing individual medium ID information on a magnetic disk 1 installed in a fixed magnetic disk drive unit. To write to the magnetic disk, the fixed magnetic disk drive unit 5 is connected to an ID writing apparatus 70 with a bus 62, as shown in FIG. 9. In the ID writing apparatus 70, an ID number 71a that is unique to the medium is generated by an individual medium ID generator 71 and encrypted by an encryptor 72 to produce encrypted data 79. Digital signature 78 of the individual medium ID is generated by a hash function operator 73 and encryptor 74. Write data 82 is produced by adding the encrypted ID data and the digital signature. The write data 82, together with a track number and a head number 77, is sent to the fixed magnetic disk drive unit 5 as a write instruction, and the individual medium ID information 4 is written on a specified track and in a specified recording plane of the-magnetic disk 1.

Figure 8:
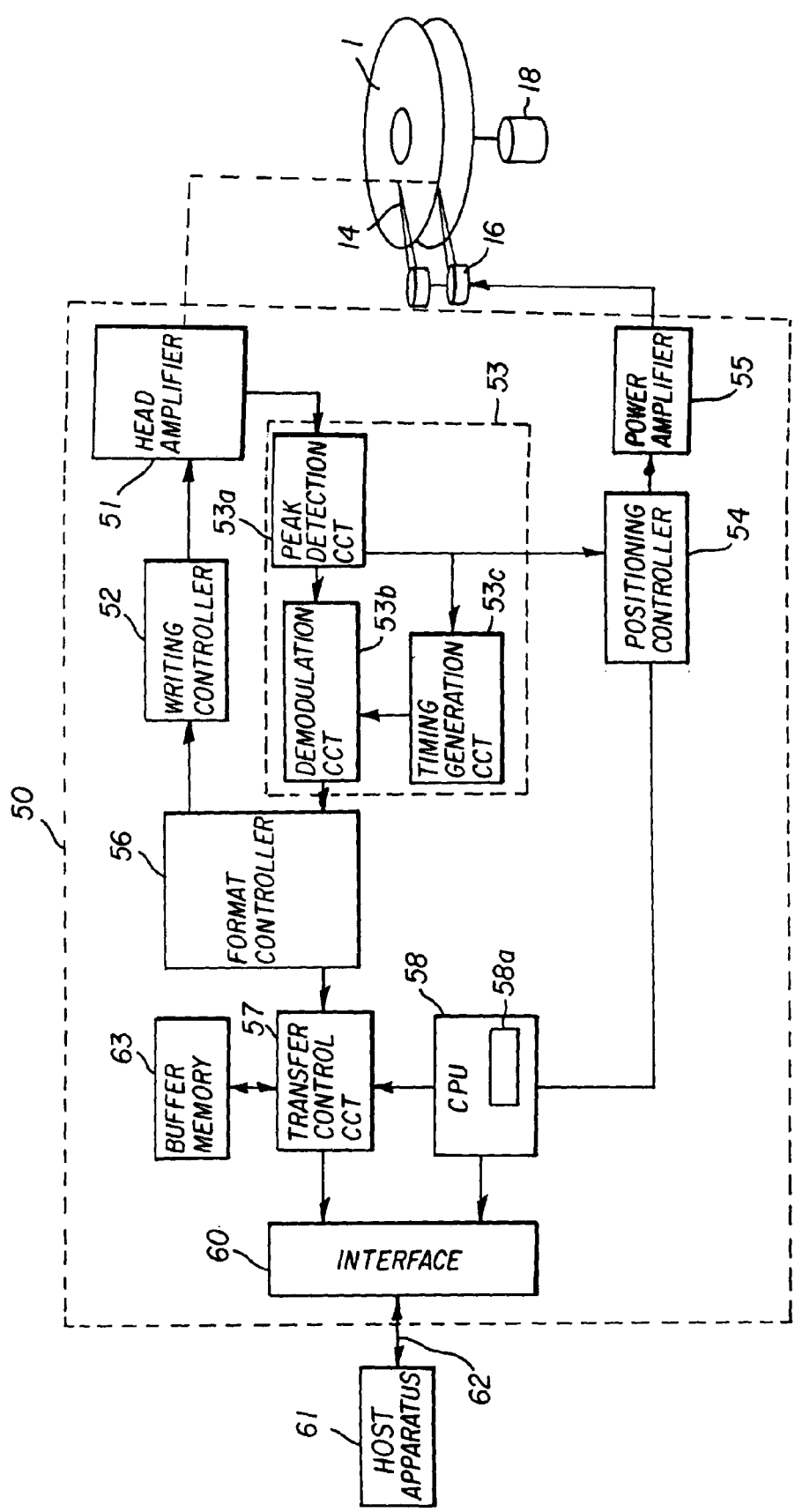
FIG. 8 shows a construction of a control system of an embodiment of a fixed magnetic disk drive unit according to the present invention.

FIG. 8 schematically illustrates a control system 50 of the fixed magnetic disk drive unit of an embodiment according to the present invention. A head amplifier 51 of the control system 50 comprises a read amplifier for amplifying head readout signal (not shown), a driver circuit for switching recording current of the magnetic head 14 (not shown), and a head selection circuit (not shown). Output signals from the head amplifier 51 is lead to readout controller 53, where the data is reproduced. The readout controller 53 comprises a peak detection circuit 53a for detecting peaks of readout signals, and a demodulation circuit 53b for decrypting channel-coded data. A format controller 56 performs format transformation of read/write data based on a prescribed sector format, verification of readout data by error correction code, and correction of occurred errors. A buffer memory 63 is a temporary storage memory for read/write data.

Figure 11:
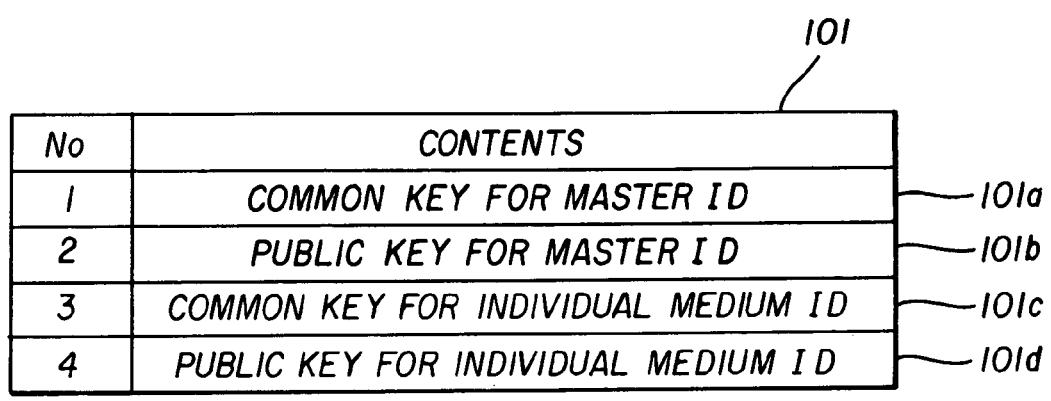
FIG. 11 shows contents of a key table stored in an embodiment of a fixed magnetic disk drive unit according to the present invention.

The fixed magnetic disk drive unit connects to a host system 61 (PC, for example,) through a bus 62. CPU 58 analysis commands sent from the host system 61 and processes each command. ROM 58a is a read only memory storing firmware of this disk drive unit. ROM 58a further stores a key table 101 keeping several key data that are necessary on reading out the ID information. FIG. 11 shows the contents of the key table 101. A common key 101a for master ID is the same key as the common key 96 that is input to the encryptor 33 in the working apparatus 31 for manufacturing the stamper shown in FIG. 7. A public key 101b for master ID is a public key pairing with the secret key 97 that is input to the encryptor 35. A common key 101c for individual medium ID is the same key as the common key 98 that is input to the encryptor 72 in the ID writing apparatus 70 in FIG. 9. A public key 101d for the individual medium ID is a public key pairing with the secret key 99 that is input to the encryptor 74.

Figure 10:
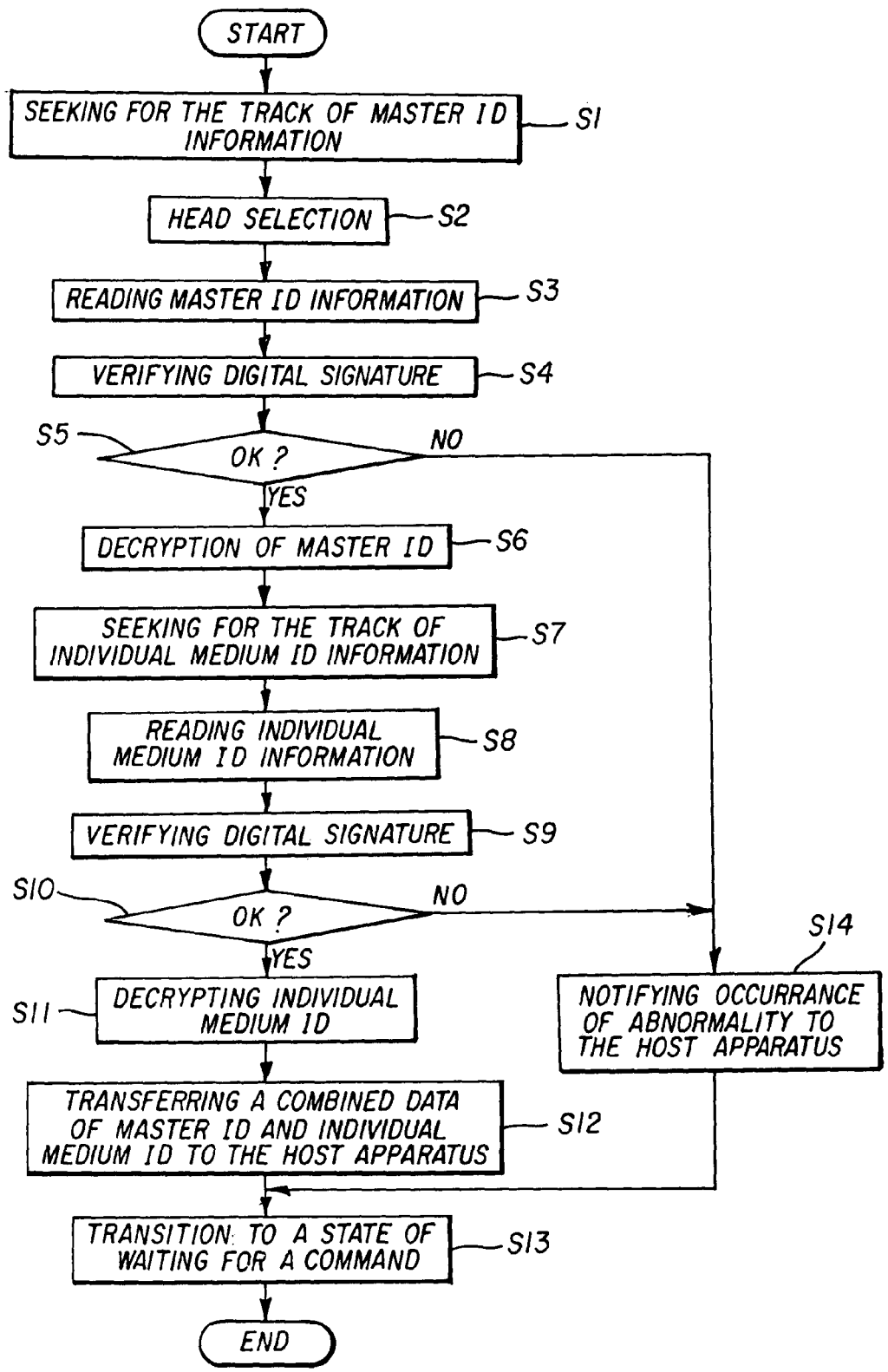
FIG. 10 is a flowchart showing a procedure for readout ID information stored in a magnetic disk in an embodiment of a fixed magnetic disk drive unit according to the present invention.

FIG. 10 is a flowchart showing a procedure for readout ID information stored in the magnetic disk in the fixed magnetic disk drive unit. Here, the fixed magnetic disk drive unit 5 is assumed in a state where initialization process after power turn on is completed and the unit is waiting for a command from a host apparatus 61. The procedure for reading ID information will be described according to this flowchart and referring to FIGS. 8 and 11.

When a command to readout an ID information of a specified head number is sent from a host apparatus 61 through the bus 62, the CPU 58 issues a command to the positioning controller 54 for the head 14 to seek for the read only track that stores the master ID information, in the step S1. In the step S2, the CPU 58 gives the head amplifier 51 a command to select the head designated by the host apparatus 61 out of a plurality of heads. Readout signals from the recording plane of the appropriate head are amplified by the head amplifier 51 and the output from the amplifier is lead through a peak detection circuit 53a to a demodulation circuit 53b, and the data from the read only track are readout from the demodulation circuit 53b as a NRZ data string. In the step S3, the CPU 58 gives the format controller 56 a command to readout the master ID information. According to the command, the NRZ data string is input to the format controller 56, where only the data in the sector storing the master ID information is extracted. The format controller 56 further executes error detection of the sector data and error correction, if necessary. After that, the sector data is stored in the buffer memory 63 through the transfer control circuit 57.

In the step S4, the CPU 58 first accesses the buffer memory 63 and decrypts the digital signature data in the sector data using a public key 101b for the master ID stored in the key table 101. Then, the CPU 58 computes a hash code of the master ID data in the sector data by a prescribed hash function. The prescribed hash function here is the same as the function applied in the hash function operator 34 in the working apparatus for producing a stamper in FIG. 7. In the step S5, the CPU 58 compares the hash code computed from the master ID with the digital signature code decrypted in the preceding step. If the two codes are not identical, the medium is judged to have some abnormality, and the occurrence of abnormality is notified to the host apparatus (S14). The processing is suspended and returns to a state waiting for a command (S13). If coincidence is verified, the processing proceeds to the next step S6.

In the step S6, the CPU 58 decrypts the encrypted master ID using the common key 101a for the master ID, to obtain a master ID (16 bits) in a clear text. In the next step S7, the CPU 58 let the magnetic head 14 seek the track storing the individual medium ID information. In the next step S8, the ID information recorded on this track is readout and the sector data including individual medium ID information is written into the buffer memory 63. In the next step S9, the CPU 58 first decrypts the digital signature data in the sector data using the public key 101d for individual medium ID. Then, the CPU 58 computes a hash code of the individual medium ID data in the sector data by a prescribed hash function. The prescribed hash function here is the same as the function applied in the hash function operator 73 in the ID writing apparatus in FIG. 9. In the next step S10, the CPU 58 compares the hash code computed from the individual medium ID with the digital signature code decrypted in the preceding step. If the two codes are not identical, the medium is judged to have some abnormality, and the occurrence of abnormality is notified to the host apparatus in the step S14. The processing is suspended and returns to a state waiting for a command. If coincidence is verified, the processing proceeds to the next step S11. In the step S11, the CPU 58 decrypts the encrypted individual medium ID using the common key 101c for individual medium ID, to obtain an individual medium ID (32 bits) in a clear text. Finally, in the step 12, the CPU 58 combines the master ID (16 bits) and the individual medium ID (32 bits) to produce an ID with 48 bits, which is sent to the host apparatus 61 through the bus 62. Then, the procedure returns to a state waiting for a command from the host apparatus 61 in the step 13. After that, the host apparatus 61 sends a command to readout ID to another head in the similar manner, if necessary. Based on the obtained ID for each head, encryption key is generated.

Since an ID information for uniquely identifying a medium is recorded separately in a preformatted region and non-preformatted region of a pre-embossed magnetic disk, the present invention provides a magnetic disk medium that inhibits manipulation and yet holds unique ID information. A fixed magnetic disk drive unit according to the present invention can include one or more such magnetic disk media and can read ID information out of the magnetic disk media and send the information to a host apparatus. Consequently, a fixed magnetic disk drive unit of the invention can be applied to a wide variety of security systems.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP 2002-205886, in its entirety, including the drawings, claims, and the specification thereof, is incorporated herein by reference.

What is claimed is:

1. A magnetic disk medium comprising:
   a substrate having a recording region, the recording region having a preformatted region with uneven surface structure, and a non-preformatted region with uniform surface structure,
   wherein ID information for uniquely identifying the magnetic disk medium is recorded in the recording region, the ID information including first ID information prestored in the preformatted region and second ID information stored in the non-preformatted region, and wherein the first ID information is different from the second ID information.

2. A magnetic disk medium comprising:

a substrate having a recording region, the recording region having a preformatted region with uneven surface structure, and a non-preformatted region with uniform surface structure, wherein ID information for uniquely identifying the magnetic disk medium is recorded in the recording region, the ID information including first ID information prestored in the preformatted region and second ID information stored in the non-preformatted region, and wherein the uneven surface structure of the preformatted region include pits that are sufficiently deep in relation to the uniform surface structure of the non-preformatted region to prevent inversion of magnetization direction by a magnetic field generated by a gap of a recording head of a fixed magnetic disk drive unit for writing to the magnetic disk medium.

3. A magnetic disk medium comprising:

a substrate having a recording region, the recording region having a preformatted region with uneven surface structure, and a non-preformatted region with uniform surface structure, wherein ID information for uniquely identifying the magnetic disk medium is recorded in the recording region, the ID information including first ID information prestored in the preformatted region and second ID information stored in the non-preformatted region, and wherein a pair of the first ID information and the second ID information are recorded on each recording surface of the magnetic disk medium and each pair has a different ID information.

4. A magnetic disk medium comprising:

a substrate having a recording region, the recording region having a preformatted region with uneven surface structure, and a non-preformatted region with uniform surface structure, wherein ID information for uniquely identifying the magnetic disk medium is recorded in the recording region, the ID information including first ID information prestored in the preformatted region and second ID information stored in the non-preformatted region, and wherein each of the first ID information and the second ID information is encrypted in terms of a prescribed cryptosystem.

5. A magnetic disk medium comprising:

a substrate having a recording region, the recording region having a preformatted region with uneven surface structure, and a non-preformatted region with uniform surface structure, wherein ID information for uniquely identifying the magnetic disk medium is recorded in the recording region, the ID information including first ID information prestored in the preformatted region and second ID information stored in the non-preformatted region, and wherein each of the first ID information and the second ID information includes a body of ID information that is identifying information and digital signature information for the body of ID information.

6. A fixed magnetic disk drive unit mounting one or more magnetic disk media comprising a substrate having a recording region, the recording region having a preformatted region with uneven surface structure, and a non-preformatted region with uniform surface structure, wherein ID information for uniquely identifying the magnetic disk medium is recorded in the recording region, the ID information including first ID information prestored in the preformatted region and second ID information stored in the non-preformatted region, the fixed magnetic disk drive unit comprising:

a readout means for reading out the first ID information and the second ID information on the magnetic disk medium;

a decryption means for decrypting the first ID information and the second ID information;

a verification means for verifying the first ID information and the second ID information based on digital signature information; and a transfer means for transferring a pair of the first ID information and the second ID information to a host apparatus.

7. A method of securing data in a magnetic recording medium, comprising the steps of:

providing a substrate having a recording region, the recording region having a preformatted region with uneven surface structure, and a non-preformatted region with uniform surface structure;

recording ID information for uniquely identifying the magnetic disk medium in the recording region, wherein the ID information includes first storing first ID information in the preformatted region and then storing second ID information in the non-preformatted region, and wherein the first ID information is different from the second ID information.

* * * * *